United States Patent [19]

Fujita et al.

[11] Patent Number: 4,922,830

[45] Date of Patent: May 8, 1990

[54] CONVEYOR SYSTEM UTILIZING LINEAR MOTOR

[75] Inventors: Shigeyoshi Fujita, Suita; Naobumi Sekiya, Nogaokakyo; Takashi Okamura, Kishiwada; Yoshitaka Watanabe, Takarazuka, all of Japan

[73] Assignee: Daifuku Co., Ltd., Osaka, Japan

[21] Appl. No.: 285,792

[22] Filed: Dec. 16, 1988

Related U.S. Application Data

[63] Continuation of Ser. No. 50,713, May 14, 1987, abandoned.

[51] Int. Cl.⁵ .............................................. B60L 13/00
[52] U.S. Cl. ................. 104/290; 246/187 B
[58] Field of Search ............... 104/290, 300, 291, 293, 104/294; 246/187 B, 122 R; 74/411.5

[56] References Cited

U.S. PATENT DOCUMENTS

| | | | |
|---|---|---|---|
| 3,536,230 | 10/1970 | Williams | 74/411.5 |
| 3,612,243 | 10/1971 | McAllister et al. | 246/122 R |
| 3,616,762 | 11/1971 | Benner | 104/290 |
| 3,774,025 | 11/1973 | Auer, Jr. et al. | 246/187 B |
| 3,891,833 | 6/1975 | Rhoton et al. | 246/187 B |
| 4,049,983 | 9/1977 | Attwood et al. | 104/290 |
| 4,066,230 | 1/1978 | Nohmi et al. | 246/187 B |
| 4,330,830 | 5/1982 | Perry | 246/187 B |
| 4,540,073 | 9/1985 | Rogier | 74/411.5 |

FOREIGN PATENT DOCUMENTS

| | | | |
|---|---|---|---|
| 2207930 | 8/1973 | Fed. Rep. of Germany | 104/290 |
| 2640247 | 3/1978 | Fed. Rep. of Germany | 246/187 B |

Primary Examiner—Russell D. Stormer
Attorney, Agent, or Firm—Webb, Burden, Ziesenheim & Webb

[57] ABSTRACT

A conveyor system comprising a conveyor vehicle, a guide rail for supporting the conveyor vehicle to be freely movable relative thereto, and a linear motor including a primary coil and a secondary conductor for driving the conveyor vehicle. The primary coil is mounted on the conveyor vehicle and the secondary conductor is mounted on the guide rail. The guide rail defines a secondary conductor support portion for limiting downward and transverse movements of the secondary conductor.

14 Claims, 8 Drawing Sheets

CONVEYOR SYSTEM UTILIZING LINEAR MOTOR

This application is a continuation of application Ser. No. 07/050,713, filed May 14, 1987 now abandoned.

BACKGROUND OF THE INVENTION (1) Field of the Invention

The present invention relates to a conveyor system utilizing a linear motor, and more particularly to a conveyor system comprising a conveyor cart having running wheels, a guide rail for movably supporting the conveyor cart, and a linear motor a primary coil and a secondary conductor for driving the conveyor cart.

(2) Description of the Prior Art

This type of conveyor system utilizing a linear motor is characterized by its ability to run the conveyor cart at high speed by means of a simple construction. This conveyor system utilizes the linear motor to provide a propelling force for the high speed running of the cart. For realizing a lightweight cart body or where relatively light articles are conveyed, the secondary conductor is mounted on the cart and the primary coil on the guide rail since this allows a simple cart body construction. Conversely, where a great propelling force is required for conveying heavy articles or where a high speed conveyance is desired, the primary coil is mounted on the cart and the secondary conductor on the guide rail.

For driving the cart by means of the linear motor, the smaller the space between the primary coil and the secondary conductor the greater propelling force is generated. The space between the primary coil and the secondary conductor is maintained by utilizing the construction wherein the conveyor cart is supported through its running wheels by the guide rail. FIG. 15 of the accompanying drawings shows an example where primary coil C is mounted on the conveyor cart or vehicle V and secondary conductor P mounted on the guide rail A. In this case the primary coil C and secondary conductor P are fixed to a vertical relative relationship by running wheels 1.

Existing conveyor systems utilizing the linear motor have unsatisfactory operability. In a positional relationship as shown in FIG. 15, for example, primary coil C or secondary conductor P mounted on the vehicle V is disposed over secondary conductor P or primary coil C mounted on the guide rail A. The primary coil and the secondary conductor usually are spaced from one another by 2 mm or less. However, the running wheels inevitably become worn with use of the conveyor system which results in reduced diameters of the running wheels and changes in the space between the primary coil and the secondary conductor. This would cause the trouble of the primary coil and the secondary conductor getting damaged through mutual contacts. It is therefore necessary to change the running wheels when appropriate. However, the changing of running wheels tends to be forgotten since their wear progresses only slowly. The running wheels left unchanged lead to the above-noted trouble impeding the working of the conveyor system.

Thus, the known conveyor systems utilizing the linear motor require the wear of the running wheels to be kept under observation. In this sense the known systems have room for improvement with respect to operability.

SUMMARY OF THE INVENTION

Having regard to the drawback of the prior art as noted above, the object of the present invention is to provide a conveyor system utilizing the linear motor with excellent operability.

In order to achieve the above object, a conveyor system according to this invention has a characterizing feature in that the guide rail supports the secondary conductor or primary coil above the primary coil or secondary conductor supported by the conveyor vehicle. This construction has the following function and effect.

Since the secondary conductor or primary coil on the guide rail is disposed above the primary coil or secondary conductor on the conveyor vehicle, a space between the primary coil and secondary conductor is enlarged as a result of wear of the running wheels which lowers the vehicle with respect to the guide rail. Therefore, even if changing of the running wheels is forgotten, the primary coil and secondary conductor will never be damaged through mutual contact. The invention is free from such a serious trouble as the primary coil and secondary conductor becoming damaged through mutual contact. Consequently, the invention provides a conveyor system utilizing the linear motor with excellent operability.

Other advantages of the conveyor system according to the present invention will be apparent from the description of preferred embodiments to follow.

DETAILED DESCRIPTION OF THE PREFERRED EMBODIMENTS

Embodiments of the present invention will be described in detail hereinafter with reference to the drawings.

Figure 1:
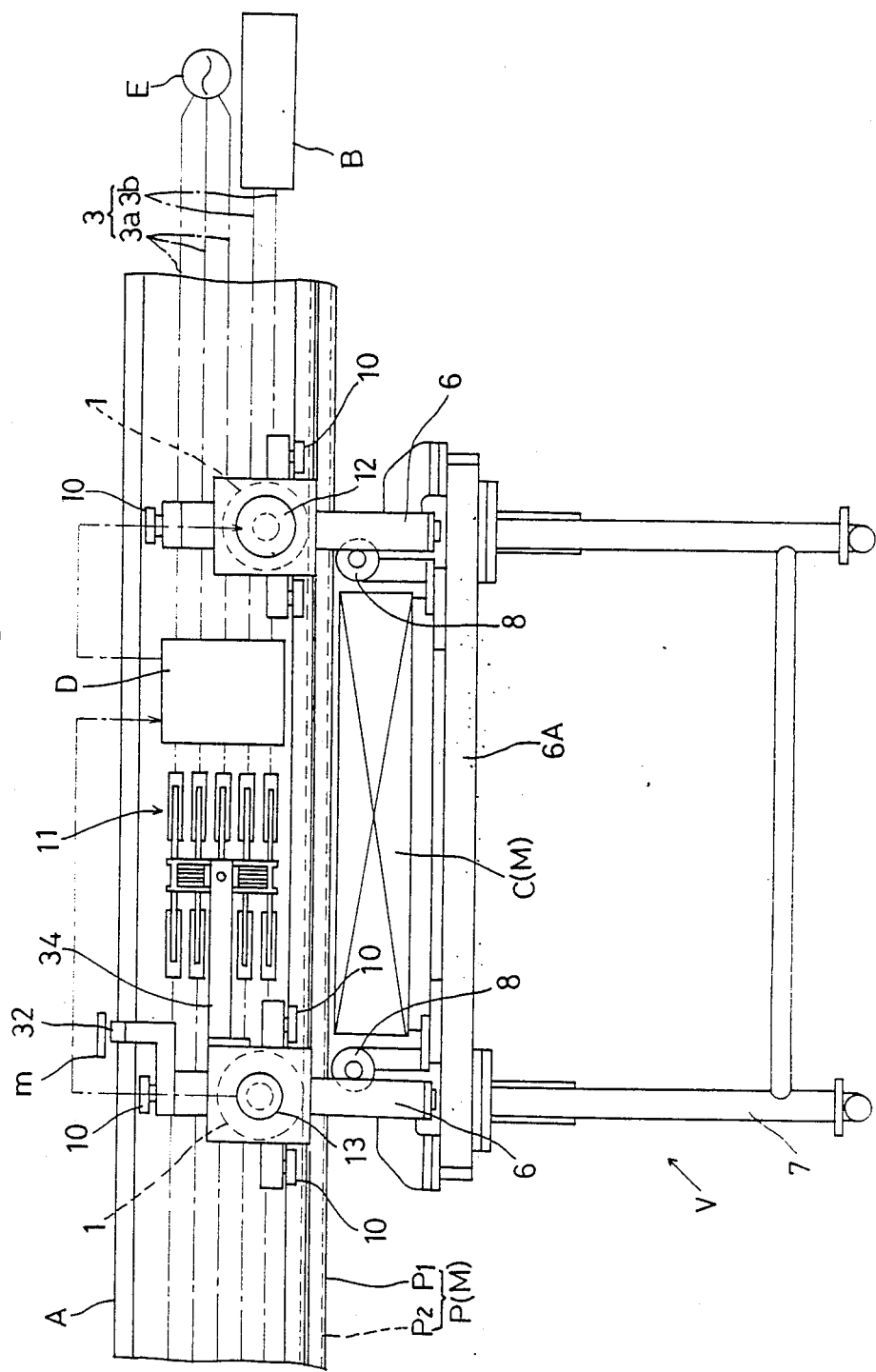
FIG. 1 is a side view of a conveying system utilizing a linear motor according to one embodiment of the present invention.
Figure 2:
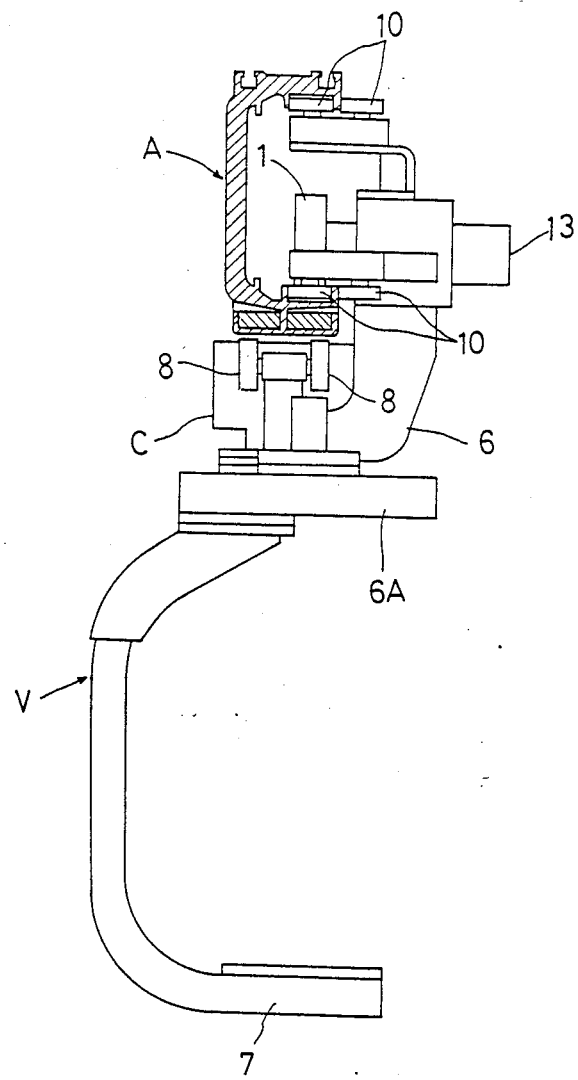
FIG. 2 is a front view of the conveying system.

As shown in FIGS. 1 and 2, a conveyor system utilizing a linear motor according to the invention comprises a guide rail A for movably supporting a conveyor cart or vehicle V having running wheels 1. The vehicle V is driven by a linear motor M to convey articles along the guide rail A.

The linear motor M comprises primary coil C attached to the vehicle V and a secondary conductor P attached to the guide rail A. The primary coil C is disposed under the secondary conductor P.

Figure 3:
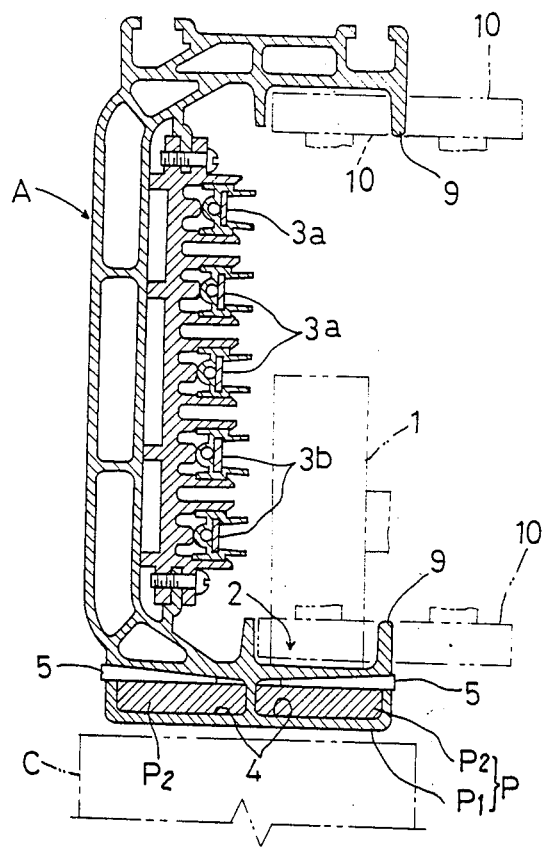
FIG. 3 is an enlarged sectional view of a guide rail in the conveying system shown in FIG. 2, FIGS. 4 and 5 are enlarged sectional views of principal portions of guide rails according to different embodiments of the invention, respectively.

Details of this construction will be described next with reference to FIGS. 1 through 3.

The guide rail A has a substantially C-shaped section and defines a channel groove 2 in a lower inside wall thereof for engaging the running wheels 1. The guide rail A supports five trolley rails or electric conductor rails 3 arranged vertically on a lateral inside wall. The conductor rails 3 consist of three power supply trolley rails 3a and two signal transmitter trolley rails 3b. The power supply trolley rails 3a supply power in three-phase current from an external power source E to the primary coil C and various devices mounted on the vehicle V. The signal transmitter trolley rails 3b are for transmitting control signals between a central control unit B on the ground and a control unit D mounted on the vehicle V.

The guide rail A includes marks m mounted on an upper end thereof to project toward an opening thereof for instructing target running speeds $\omega$ of the vehicle V, as described in detail later. These marks m are formed of a magnetic material such as steel.

Figure 16:
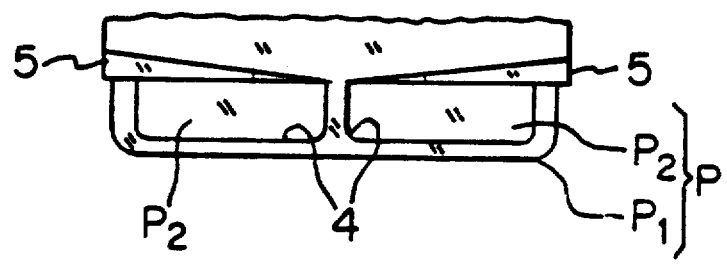
FIG. 16 is an end view of a portion of the structure shown in FIG. 3.

For providing the secondary conductor P on the guide rail A, the guide rail A is formed of a non-magnetic material such as aluminum and includes a bottom face thereof acting as non-magnetic member P1 constituting part of the secondary conductor P. The bottom wall of the guide rail A defines two right and left hollows 4 extending in parallel longitudinally of the guide rail A. Magnetic members P2 formed of a magnetic material such as steel are inserted into these hollows 4 from an end or ends of the guide rail A, as shown in FIG. 16, and securely supported therein to constitute part of the secondary conductor P. Thus, the secondary conductor P has a composite construction comprising the non-magnetic member P1 defined on the bottom face of the guide rail A itself and the magnetic members P2 inserted into the hollows 4 defined in the bottom wall of the guide rail A, thereby to provide a strong propelling force. Wedges 5 are driven in at suitable lateral positions of the guide rail A to secure the magnetic members P2 to the guide rail A while allowing expansion and contraction thereof longitudinally of the guide rail A. By securing the magnetic members P2 to the guide rail A by means of the wedges 5 acting in transverse directions, the difference in longitudinal expansion and contraction due to a difference in thermal expansion coefficient between the magnetic members P2 and the guide rail A can be absorbed by a relative longitudinal movement between the magnetic members P2 and guide rail A. The hollows 4 constitute a secondary conductor support for preventing or limiting downward and transverse movements of the magnetic members P2 constituting part of the secondary conductor P. The secondary conductor support formed integrally with the guide rail A as described above simplifies a secondary conductor mounting operation, and greatly improves the efficiency of installation of the conveyor system.

Figure 4:
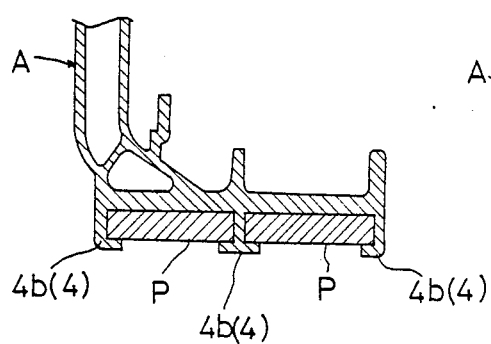

The secondary conductor support may have various configurations only if the downward and transverse movements of the secondary conductor P are prevented or limited. As shown in FIG. 4, for example, the guide rail A may include projections 4b having L-shape and inverted T-shape sections formed integrally with the bottom face thereof, namely the face opposed to the primary coil C, these projections 4b being at lateral sides of secondary conductors P, respectively. In this case the secondary conductors P in band plate form are inserted from a longitudinal end or ends of the guide rail A, and the projections 4b act to prevent or limit the downward and transverse movements of the secondary conductors P.

Figure 5:
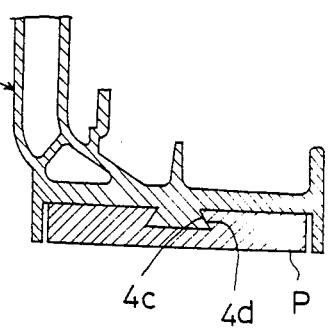

FIG. 5 shows a further example of secondary conductor support structure which includes engaging portions 4c and 4d formed integrally with the secondary conductor P and the guide rail A, respectively. These engaging portions 4c and 4d are in engagement with one another to prevent the downward and transverse movements of the secondary conductor P.

Instead of the composite construction comprising the non-magnetic member P1 and the magnetic members P2 such as of steel placed one over the other to provide a strong propulsive force, the secondary conductor P may be formed only of a non-magnetic material such as aluminum or of a non-magnetic material. The guide rail A itself may comprise a non-magnetic material or a magnetic material formed into a desired shape by injection molding, extrusion molding or press shaping. The guide rail A may be formed of a non-metallic material, with the secondary conductor support comprising hollows 4 for receiving the secondary conductor P or engaging portions for retaining the secondary conductor P. Further, for the secondary conductor P to be supported by the guide rail A, the secondary conductor P may just be press fit to the secondary conductor support formed integrally with the guide rail A.

Although transverse expansion and contraction of the guide rail A and the magnetic members P2 occur only to a limited extent and are therefore negligible, the hollows 4 may be formed slightly wider than the magnetic members P2 mounted therein for absorbing the expansion and contraction.

The conveyor vehicle V comprises main frames 6 provided at a front end and a rear end thereof, respectively, each main frame having a substantially L-shaped configuration when viewed from the vehicle front, and a connecting frame 6A interconnecting lower ends of the main frames 6. The vehicle V further comprises a carrier 7 disposed below the vehicle body for supporting the articles. The carrier 7 includes as its main components a front and a rear pipe members bent into a substantially C-shaped configuration.

The primary coil C is mounted above the connecting frame 6A, and space setting rollers 8 are provided below the running wheels 1. Therefore, even when an attraction is generated between the secondary conductor P and the primary coil C, the primary coil C never contacts the guide rail A. In other words, the rollers 8 contact an outer bottom surface of the guide rail A as the vehicle V moves up and down, to prevent the primary coil C from approaching the secondary conductor P within a predetermined distance thereto. With this construction, therefore, no trouble will result from minor errors occurring when the primary coil C is assembled into the conveyor vehicle V or when the secondary conductor P is assembled into the guide rail A.

The running wheels 1 are mounted adjacent top ends of the main frames 6 which act as support frames. A pair of right and left guide rollers 10 is provided at the top end of each main frame 6 and in front of and behind each running wheel 1. The guide rollers 10 contact right and left sides of ridges 9 defined at upper and lower ends of the inside wall of the guide rail A, to prevent the vehicle V from running off the guide rail A.

Number 11 in FIG. 1 indicates a collector unit opposed to the trolley rails 3 mounted on the lateral inside wall of the guide rail A. The collector unit 11 is attached to a bracket 34 extending from one of the main frames 6. Number 32 indicates a magnetism-responsive proximity sensor for detecting the marks m for instructing target running speeds. The sensor 32 outputs a mark detection signal S1 which becomes high level during a mark detection time and low level during a non-detection time.

One of the running wheels 1 is provided with an electromagnetic running brake 12 which is operable when not electrified and inoperable when electrified. The other running wheel 1 is provided with a rotary encoder 13 acting as rotation detecting sensor for detecting a rotational speed of this running wheel 1, namely a running speed and a running distance. This rotary encoder may be replaced, for example, by a tachogenerator.

The conveyor vehicle V runs while information is exchanged via the two signal transmitting trolley rails 3b between the central control unit B and the control unit D mounted on the vehicle V. The running distance and speed of the vehicle V relative to the guide rail A are calculated on the basis of information provided by the rotary encoder 13. Thus, the vehicle V is locatable at all times. In other words, the position of vehicle V is known through the central control unit B on the ground. By controlling electrification of the primary coil C and the electromagnetic brake 12, the conveyor system starts the vehicle V from a fixed position, and accelerates, decelerates and stops the vehicle V all automatically. Under these controls the vehicle V runs continuously and in a stable manner at instructed speeds. Besides, the vehicle V can be stopped at a selected position by correcting errors as to the stopping position.

For controlling the electrification of the primary coil C, the foregoing embodiment employs a voltage control mode wherein the voltage applied to the primary coil C is varied to adjust the acceleration, deceleration and running speed of the vehicle V.

Figure 6:
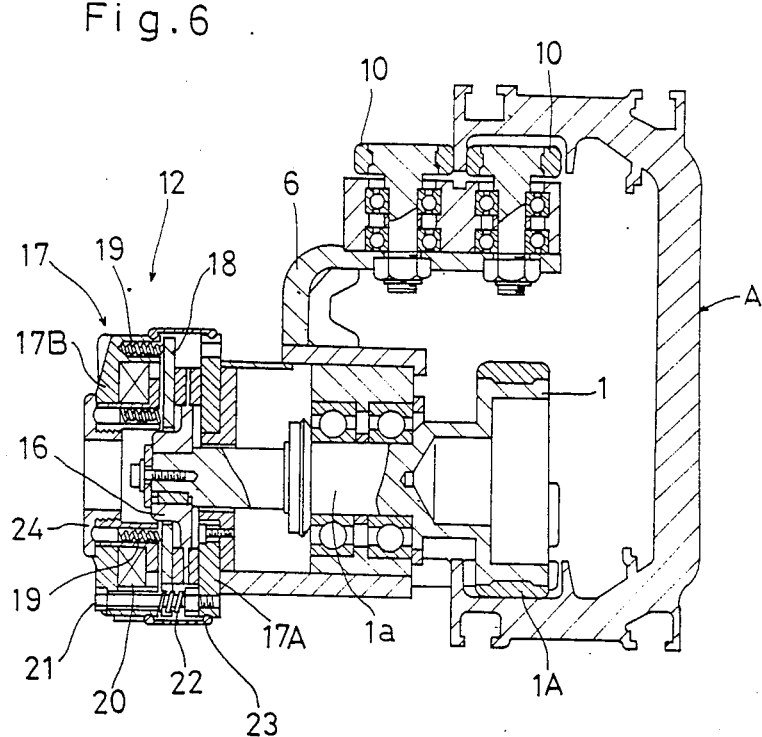
FIG. 6 is a partly broken away rear view of a brake mounting structure employed in the conveying system according to this invention.

FIG. 6 is an enlarged view of the electromagnetic brake 12 for braking the vehicle V. This brake 12 is the disk type comprising a rotor 16 rotatable with an axle 1a, and an armature 18 supported by a brake casing 17 to be movable axially of the axle 1a. The armature 18 is biased by springs 19 to return to a braking position, and is movable by an electromagnetic coil 20 against the biasing force of springs 19.

The brake casing 17 comprises an inner case portion 17A attached to the vehicle V acting also as a flange, and an outer case portion 17B acting also as stator. The two case portions 17A and 17B are interconnected by bolts 21 extending through the outer case portion 17B and screwed into the inner case portion 17A. The two case portions 17A and 17B are biased away from one another by springs 22 fitted on the bolts 21. Thus, a space between the armature 18 and the outer case portion 17B is adjustable by turning the bolts 21. Number 23 in FIG. 6 indicates a dust cover extending between the two case portions 17A and 17B. Number 24 indicates an adjuster ring screwed onto the outer case portion 17B for adjusting the force of the springs 22 for biasing the armature 18. Number 1A indicates an anti-slipping rubber ring mounted peripherally of the running wheel 1.

Figure 7:
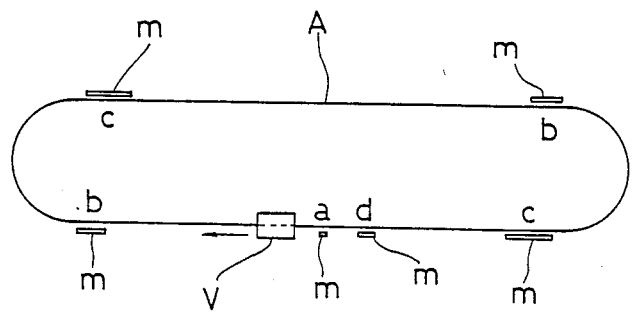
FIG. 7 is a schematic plan view of a guide rail layout.

A running control mode will be described next with reference to FIG. 7 showing a case where the guide rail A defines a running track in loop form. The running track includes a vehicle starting point a, curve starting points b, curve ending points c, and a poir' d short of the vehicle starting point a. Each of these points a–d is provided with the target speed instructing mark m having a length L corresponding to a target vehicle speed ω for each section of the running track. The primary coil C of the linear motor M is electrified under control according to information provided by a mark length detector G to be described later. The vehicle V is controlled to start from the vehicle starting point a, make a circle along the guide rail A and stop at the vehicle starting point a. During the run the vehicle speed is automatically changed to high speed at straight running sections and to low speed at curved sections. Simultaneously therewith, the central control unit B is in communication with the control unit D on the vehicle V through the signal transmitting trolley rails 3b to automatically start and stop the vehicle V.

The mark length detector G and speed control means operable in response to the information provided by the detector G will be particularly described hereinafter. The speed control means controls the running speed of the conveyor vehicle V, namely the electrification of the primary coil C of linear motor M.

Figure 8:
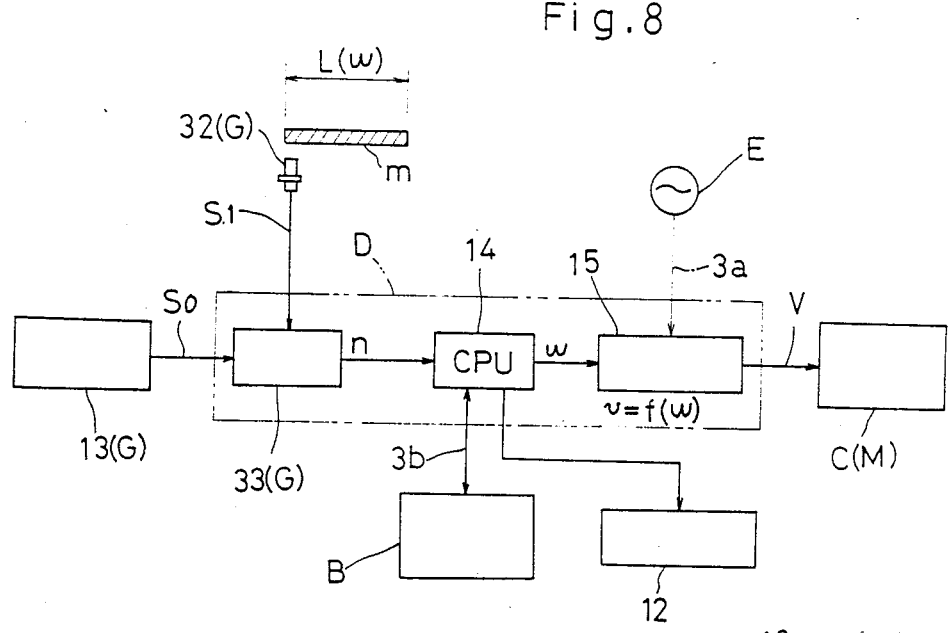
FIG. 8 is a block diagram of running controls.

As shown in FIG. 8, the mark length detector G includes a counter 33 for counting a pulse signal S0 output from the rotary encoder 13 only during the time at which the mark detection signal S1 output from the proximity sensor 32 is in high level. The length L of each mark m, namely the target running speed ω, is accurately detected on the basis of a count n of the counter 33 regardless of variations in the running speed of vehicle V.

The speed control means comprises a CPU 14 for calculating the target speed ω, and a speed controller 15 for controlling the running speed of the vehicle V. The CPU 14 calculates the target speed ω such that the greater the count n of the counter 33 or the detected length L the higher the target speed ω becomes. The speed controller 15 is operable in accordance with the target speed ω calculated by the CPU 14 to control the running speed of the vehicle V by means of phase angle of the voltage v applied to the primary coil C. Thus, the counter 33, CPU 14 and speed controller 15 consititute the control unit D.

How the control unit D operates will be described next.

When a start command from the central control unit B is input to the CPU 14 through the signal transmitting trolley rails 3b, the CPU 14 releases the electromagnetic brake 12 and supplies the primary coil C with a voltage v corresponding to a predetermined initial speed thereby to start the vehicle V.

From then on, acceleration and deceleration are repeated in accordance with the lengths of marks m disposed at the points b–d until the mark m disposed at the vehicle starting point a for showing a stopping position. The repeated speed variations are effected by the speed controller 15 which controls the voltage v applied to the primary coil C to provide the higher running speed the greater the detected length L is. In other words, the vehicle V is controlled to run at the target speed ω set for each of the sections between the points b, c and d. In order to stop the vehicle V upon detecting the mark m at the vehicle starting point a, the control is arranged to reduce the target speed ω to zero in response to any length not exceeding the length of this mark m.

When the vehicle V completes a circle run along the guide rail A and reaches the starting point a, the power for the electromagnetic brake 12 is cut off to automatically stop and retain the vehicle V at the starting point a. For effecting an emergency stop, the central control unit B outputs an emergency stop command which cuts off the power for the primary coil C, whereby the vehicle V is automatically stopped.

The described running control system employs the marks m disposed at the upper end of the guide rail A for instructing the target speeds ω, but such marks m are not absolutely necessary. That is, the central control unit B may be adapted to instruct the vehicle V to start, accelerate, decelerate and stop at appropriate times in response to signals received from the rotary encoder 13 indicating running distances.

The running brake 12 may comprise a drum type or other types of brake instead of the disk type. Further, the brake may be operable with fluid pressure instead of electromagnetic force although the latter is preferable with a view to lightening and simplifying the vehicle V. Since in the foregoing embodiment the electromagnetic brake 12 is mounted on the vehicle V, the guide rail A need not have a complicated construction for stopping the vehicle V. This permits the entire conveyor system to have a simple construction and the vehicle V to be braked reliably at any position as necessary. Therefore, the vehicle V may be stopped properly at times of emergency also.

Since the running brake 12 is biased to the operative position when not electrified, the vehicle V may be stopped automatically at times of power failure or in other abnormal situations. This arrangement is advantageous from the safety point of view. Furthermore, the vehicle V running at high speed may be stopped at a selected position with high precision. It nevertheless will not present any problem if the running brake is biased to the inoperative position instead.

Figure 9:
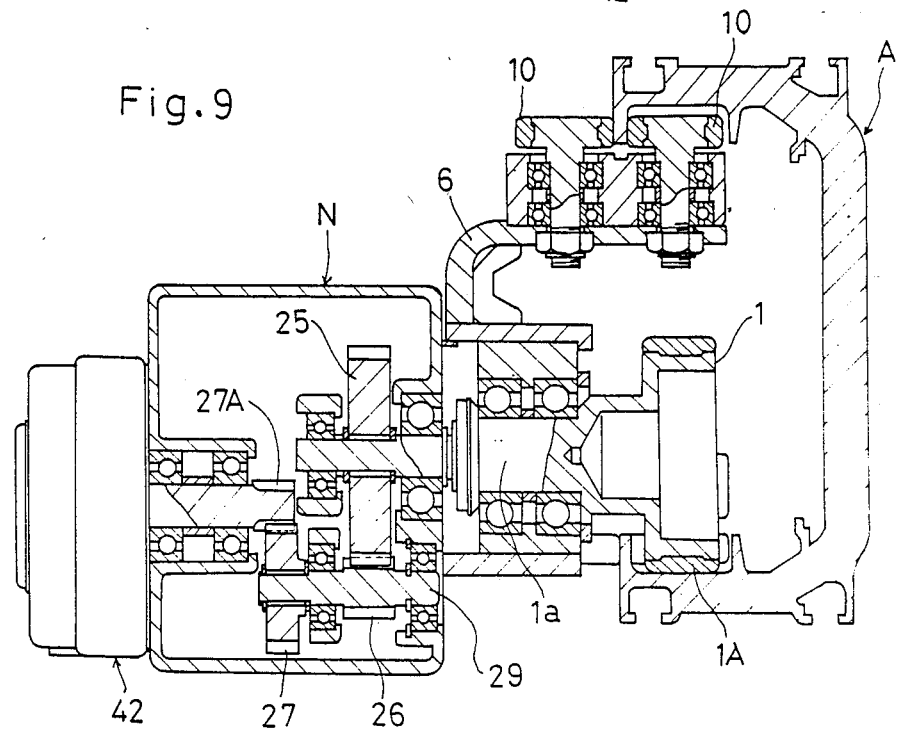
FIG. 9 is a partly broken away rear view of a brake mounting structure according to another embodiment of the invention.

FIG. 9 shows a spur gear reduction mechanism N for permitting the running brake to comprise a small brake 42 providing a small braking force. This reduction mechanism N includes a large gear 25 rotatable with the axle 1a, a small gear 26 and a large gear 27 provided on a relay shaft 29, and a small gear 27A connected to the brake 42. Instead of this construction, the reduction mechanism N may comprise various other types such as the worm gear type, hypoid gear type, cycloid gear type, planetary gear type and harmonic type.

A conductor structure of the vehicle V employed in the conveyor system of this invention will be described next.

Figure 10:
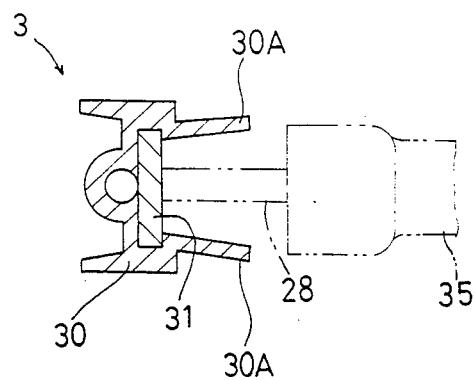
FIG. 10 is a partial front view in vertical section of a conductor rail.

FIG. 10 is an enlarged sectional view of one of the conductor rails 1 which comprises a main rail body 31 formed of a conductive material such as copper and a holder 30 formed of a nonconductive material such as synthetic resin. The holder 30 includes a pair of protective walls 30A projecting from opposite sides of the main rail body 31 toward collectors 28 described hereinafter. Number 35 in FIG. 10 indicates collector holders for supporting the collectors 28.

Figure 11:
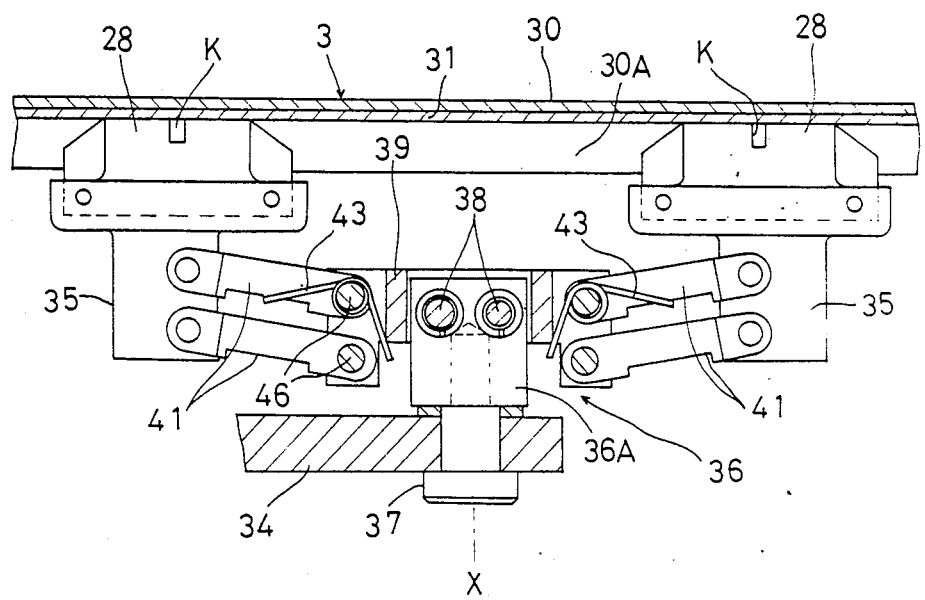
FIG. 11 is a partly broken away plan view of a current collector support incorporated into a conduction structure of a conveyor vehicle used in the conveyor system of the invention.
Figure 12:
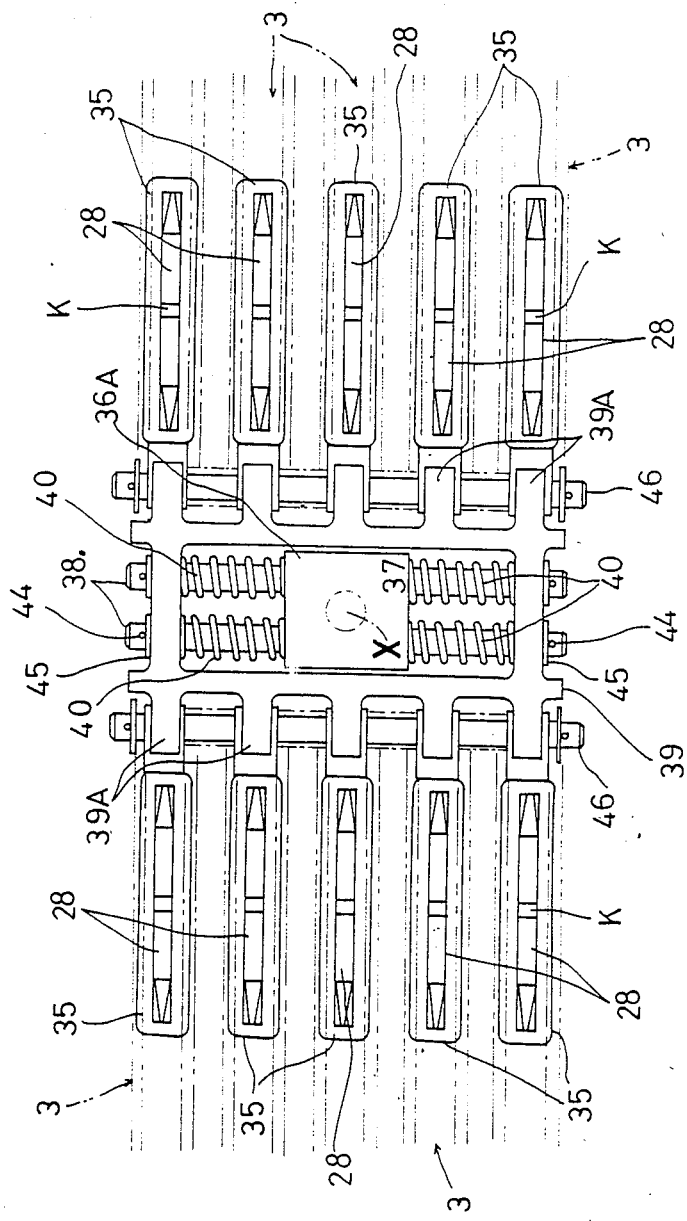
FIG. 12 is a side view of the collector support shown in FIG. 11, FIGS. 13 and 14 are partial front views in vertical section of modified conductor rails.

As shown in FIGS. 11 and 12, the collector unit 11 includes a pair of collectors 28 for each conductor rail 3. The collectors 28 constituting the pair for one conductor rail 3 are spaced from one another longitudinally of the vehicle V. The collectors 28 are supported through a collector support frame 36 by the vehicle V. The support frame 36 has a center portion thereof longitudinally of the vehicle V supported to be rotatable on an axis X extending parallel to the direction of projection of the protective walls 30A. The support frame 36 comprises a base frame 36A rotatably attached by a pivot pin 37 to the bracket 34 on the vehicle V, a pair of slide shafts 38 slidably extending through the base frame 36A, an intermediate frame 39 attached to the slide shafts 38, springs 40 for biasing the slide shafts 38 to mid-positions in their sliding direction, the collector holders 35, and a pair of links 41 connecting each of the collector holders 35 to the intermediate frame 39 to be movable parallel to the direction of projection of the protective walls 30A. Further, coil springs 43 are provided to act on the links 41 to bias the collector holders 35 toward the conductor rail 3.

The intermediate frame 39 is mounted on the pair of slide shafts 38. Each slide shaft 38 is penetrated at upper and lower ends thereof by pins 44. These pins 44 act, through washers 45, to receive and retain the intermediate frame 39 in position on the slide shafts 38. The intermediate frame 39 includes, at each of its forward and rearward ends, link supports 39A formed in five vertical levels, and link pivoting pins 46 extend through these five link supports 39A.

Thus, the pair of collectors 28 opposed to one conductor rail 3 is oscillatable in seesaw movements transversely of the conductor rail 3 (that is vertically in FIG. 12). A contact pressure acting on the protective walls 30A is mitigated by causing both of the collectors 28 to contact the protective walls 30A. When the vehicle V moves vertically relative to the guide rail A due to vibrations, the intermediate frame 39 of the support frame 36 moves transversely of the conductor rails 3, namely vertically, thereby preventing the collectors 28 from colliding hard with the protective walls 30A. Each of the collectors 28 includes a cutout groove K at a mid-position in the fore and aft direction for cleaning and other purposes.

The support frame 36 may have various specific constructions other than the construction described above. It will serve the purpose if the support frame 36 is rotatable on the axis X extending parallel to the direction of projection of the protective walls 30A.

In the foregoing embodiment, all of the collectors in five levels opposed to the five conductor rails are oscillatable in unison. However, each pair of collectors opposed to one conductor rail may be supported by an individual support frame, and five such support frames may be adapted rotatable independently of one another.

Figure 13:
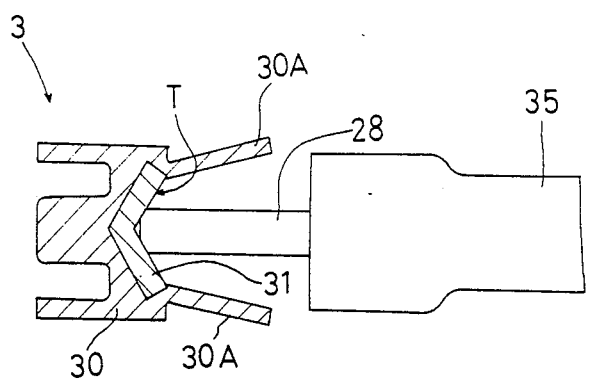
Figure 14:
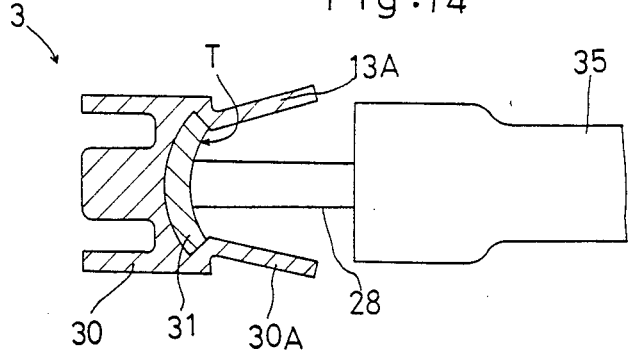
Figure 15:
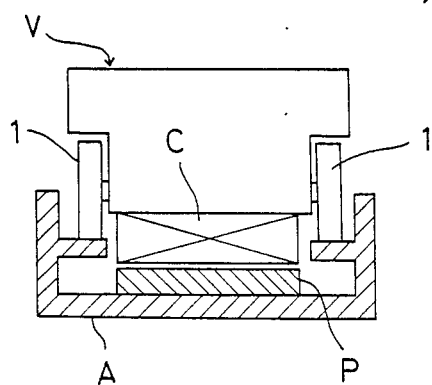
FIG. 15 is a schematic sectional view of a known conveyor system utilizing a linear motor.

The sectional construction of conductor rail 3 may be modified as shown in FIGS. 13 and 14. In FIG. 10 the conductor rail 3 defines a flat surface for contacting the collectors 28. The examples shown in FIGS. 13 and 14 comprise conductor rails 3 defining an angled surface T and a curved surface T, respectively. The conductor rail 3 with such a surface T has the advantage of avoiding damage to the protective walls 30A and generation of abrasion powder caused by the collectors 28 contacting the upper and lower protective walls 30A which results from vertical movements of the collectors 28 incidental to the running of vehicle V. The contacting surface T of conductor rail 3 as shown in FIGS. 13 and 14 may be varied in sectional shape in many ways. It will serve the purpose if the contacting surface T is recessed progressively deeper toward the center transversely of the conductor rail.

The present invention may be embodied with the secondary conductor P mounted on the conveyor vehicle V and the primary coil mounted on the guide rail A. In this case, the primary coil C may be provided throughout the entire length of the guide rail A, or may be arranged at fixed intervals wherein the vehicle is allowed to run by inertia between two adjacent primary coils.

The present invention of course is applicable also to the construction where the conveyor vehicle V runs along the upper face of the guide rail. In any case it is in accordance with the present invention if the primary coil or secondary conductor mounted on the vehicle V is below the secondary conductor or primary coil or coils mounted on the guide rail A such that the primary coil and the secondary conductor will not approach one another with wear of the running wheels.

What is claimed is:

1. A conveyor system utilizing a linear motor comprising:
   a conveyor vehicle having running wheels;
   a guide rail for supporting said conveyor vehicle to be freely movable relative thereto;
   a linear motor disposed downwardly of said running wheels and including a primary coil and a secondary conductor for driving said conveyor vehicle, said secondary conductor including a magnetic member and a conducting member, said primary coil attached to said conveyor vehicle, with said primary coil disposed downwardly of and horizontally opposed to said secondary conductor attached to said guide rail;
   magnetic member support means formed by said conducting member and defined integrally with said guide rail, said magnetic member support means limiting downward and transverse movements of said magnetic member with said support means surrounding said magnetic member;
   an opening defined at least one end of said magnetic member support means in a longitudinal direction of said guide rail; and
   an electromagnetic brake for acting on one of said running wheels, said brake biased to an operative position thereof.

2. A conveyor system as claimed in claim 1 wherein said brake is operatively connected to one of said running wheels through a reduction mechanism.

3. A conveyor system as claimed in claim 2 wherein said sensor comprises a rotary encoder.

4. A conveyor system as claimed in claim 2 wherein said sensor comprises a tachogenerator.

5. A conveyor system defined in claim 1, further comprising:
   limiting means for preventing said magnetic member inserted into said magnetic member support means from moving in the longitudinal direction of said guide rail.

6. A conveyor system as claimed in claim 5 wherein the conveyor vehicle includes a sensor for detecting an amount of rotation of said running wheels.

7. A conveyor system utilizing a linear motor comprising:
   a conveyor vehicle having running wheels,
   a guide rail for supporting said conveyor vehicle to be freely movable relative thereto,
   a linear motor disposed downwardly of said running wheels and including a primary coil and a secondary conductor for driving said conveyor vehicle, said primary coil attached to said conveyor vehicle and disposed downwardly of said secondary conductor, which is attached to said guide rail,
   wherein said guide rail integrally defines secondary conductor support means for limiting downward and transverse movements of said secondary conductor with said support means surrounding said secondary conductor, and
   an electromagnetic brake means acting on one of said running wheels and biased to an operative position, said brake means operatively connected to one of said running wheels through a reduction mechanism.

8. A conveyor system as claimed in claim 7 wherein said conveyor vehicle includes a sensor for detecting an amount of rotation of said running wheels.

9. A conveyor system as claimed in claim 8 wherein said sensor comprises a rotary encoder.

10. A conveyor system as claimed in claim 8 wherein said sensor comprises a tachogenerator.

11. A conveyor system utilizing a linear motor comprising:
    a conveyor vehicle having running wheels,
    a guide rail for supporting said conveyor vehicle to be freely movable relative thereto,
    a linear motor disposed downwardly of said running wheels and including a primary coil and a secondary conductor for driving said conveyor vehicle, said primary coil attached to said conveyor vehicle and disposed downwardly of said secondary conductor, which is attached to said guide rail, wherein said guide rail integrally defines secondary conductor support means for limiting downward and transverse movements of said secondary conductor with said support means surrounding said secondary conductor, said secondary conductor support means having at least one longitudinal end defining an opening for inserting said secondary conductor, said primary coil being horizontally opposed to said secondary conductor, and
    an electromagnetic brake for acting on one of said running wheels through a reduction mechanism, said brake biased in an operative position thereof.

12. A conveyor system as claimed in claim 11 wherein said conveyor vehicle includes a sensor for detecting an amount of rotation of said running wheels.

13. A conveyor system as claimed in claim 12 wherein said sensor comprises a rotary encoder.

14. A conveyor system as claimed in claim 12 wherein said sensor comprises a tachogenerator.

* * * * *

UNITED STATES PATENT AND TRADEMARK OFFICE
CERTIFICATE OF CORRECTION

Page 1 of 2

PATENT NO. : 4,922,830

DATED : May 8, 1990

INVENTOR(S) : Shigeyoshi Fujita, Naobumi Sekiya, Takashi Okamura and Yoshitaka Watanabe It is certified that error appears in the above-identified patent and that said Letters Patent is hereby corrected as shown below:

Please insert FIG. 16 as shown on the attached page, as the last page of the drawing sheets.

Column 1 Line 14 after "motor" insert --,--.

Claim 1 Line 52 Column 9 after "defined" insert --at--.

Signed and Sealed this

Twenty-second Day of October, 1991

Attest:

HARRY F. MANBECK, JR.

*Attesting Officer*         *Commissioner of Patents and Trademarks*